Patented Aug. 31, 1954

2,688,024

UNITED STATES PATENT OFFICE 2,688,024

PRODUCTION OF 3-PYRAZOLIDONES

John David Kendall, George Frank Duffin, and Anthony Joseph Axford, Ilford, England, assignors to Ilford Limited, Ilford, England, a British company No Drawing. Application October 6, 1952, Serial No. 313,364

Claims priority, application Great Britain October 17, 1951

10 Claims. (Cl. 260—310)

This invention relates to the production of 3-pyrazolidones and particularly to substituted 3-pyrazolidones which are generally of value in compounding photographic developer.

Many processes have been described which show that when an unsaturated acid is heated with a hydrazine, a 5-pyrazolidone is obtained. Thus, for example, Stolz, Berichte, 28, 626 has shown that the reaction of acrylic acid with phenyl hydrazine yields 1-phenyl-5-pyrazolidone, Knorr and Duden, Berichte, 25, 762 have shown that the reaction of crotonic acid with phenyl hydrazine gives 1-phenyl-3-methyl-5-pyrazolidone, and German Patent No. 67,213 discloses that the reaction of crotonic acid with 4-ethoxy phenyl hydrazine yields 1-(4'-ethoxyphenyl)-3-methyl-5-pyrazolidone.

It has now surprisingly been found, however, that if there is used, instead of an unsaturated acid, a corresponding ester, 3-pyrazolidones are obtained, and according to the present invention, therefore, a process of producing 3-pyrazolidones comprises reacting a hydrazine of the general formula $RNH.NH_2$ where R is a hydrogen atom or a hydrocarbon group, with an ester of the general formula:

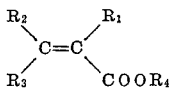

where $R_1$, $R_2$ and $R_3$ are hydrogen atoms or hydrocarbon groups and $R_4$ is a hydrocarbon group.

The reaction apparently proceeds by elimination of the elements of an alcohol $R_4OH$ and the cyclisation of the ester to yield a 3-pyrazolidone of the general formula:

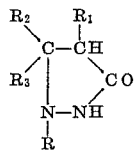

The esterifying hydrocarbon group $R_4$ is preferably a lower alkyl group, e. g. methyl, ethyl, propyl or butyl, though it may be an aryl, e. g. phenyl or naphthyl, or an aralykyl, e. g. benzyl group. Its nature is of less importance for the reason that it does not appear in the 3-pyrazolidone obtained. The groups $R_1$, $R_2$ and $R_3$ may be hydrogen atoms or may be, for example, any of the hydrocarbon groups mentioned above. The group R may also be hydrogen or any of the aforesaid hydrocarbon groups but it is preferably a phenyl group since the reagent phenyl hydrazine is readily obtainable and the products, the 1-phenyl-3-pyrazolidones, appear to be generally the most useful technically.

In the preferred form of this invention R is a phenyl or substituted phenyl (e. g. halogenophenyl or alkylphenyl) group, $R_1$ is hydrogen or an alkyl group, $R_2$ is hydrogen, phenyl, substituted phenyl oralkyl, and $R_3$ is hydrogen or alkyl.

The reaction is preferably carried out in anhydrous conditions and in the presence of a basic condensing agent. It has been found that the reaction proceeds more easily and completely as the base used is stronger. The hydrazine itself may serve as the required base, but generally is not very efficient. Organic bases, and particularly the stronger organic bases, such as triethylamine, give substantially improved yields, but the best results have been obtained using very strong bases such as alkali hydroxides or alkoxides in equimolecular proportion to the reagents, or in slight excess over that proportion.

The following examples will serve to illustrate the invention:

EXAMPLE 1

*1-phenyl-3-pyrazolidone*

*Method A.*—Ethyl acrylate (106 cc.) and phenyl hydrazine (100 cc.) were heated under reflux on a steam bath for 20 hours. After cooling the resulting oil was dissolved in ether (500 cc.) and extracted twice with 10% aqueous sodium hydroxide (200 cc.). The combined alkaline solution was saturated with carbon dioxide at 0° when a crystalline precipitate was formed. After filtration the solid was recrystallised from water to give a low yield of 1-phenyl-3-pyrazolidone as colourless plates, M. Pt. 121°.

*Method B.*—Ethyl acrylate (10.6 cc.), phenyl hydrazine (10.0 cc.) and triethylamine (1.0 cc.) were heated under reflux on a steam bath for sixteen hours. After cooling the viscous mass was dissolved in benzene (20 cc.) and cooled when a mass of crystals came out slowly during two hours. After filtration and drying, the solid was recrystallised from water to give 1-phenyl-3-pyrazolidone as colourless plates, M. Pt. 121°. The yield was substantially greater than by method A.

*Method C.*—Sodium (3.0 g.) was dissolved in absolute ethanol (50 cc.) and then benzene (50 cc.), pure phenyl hydrazine (10.0 cc.) and ethyl acrylate monomer added, in that order. The resulting solution was refluxed for sixteen hours and then evaporated under reduced pressure at 100° to remove all volatile material. The solid residue was dissolved in water (50 cc.) and the solution saturated with carbon dioxide at 0°. The resulting white crystalline mass was filtered off and recrystallised from water to give colourless plates of 1-phenyl-3-pyrazolidone, M. Pt. 121°. The yield was substantially greater than by method B.

EXAMPLE 2

1-phenyl-4-methyl-3-pyrazolidone

Phenyl hydrazine (10 cc.) was added to a solution of sodium (3 gm.) in ethanol (100 cc.) in a flask equipped with a reflux condenser. Methyl methacrylate (10.4 cc.) monomer was added to this mixture via the condenser. After 5 minutes' heating on a water bath the solution set to a gelatinous mass. The excess alcohol was removed under reduced pressure, after heating had been continued for 1½ hours, and water (35 cc.) then added to dissolve the residue.

Carbon dioxide was then passed into this solution until saturated, when the product precipitated as a buff mass. The latter was filtered off and dried in a vacuum desiccator. Yield 9 gm. The crude material was dissolved in a little benzene and this solution diluted with petroleum ether and allowed to stand. The fine crystals which soon appeared melted at 135° C.

Similar results were obtained using 3 g. sodium in 100 cc. benzene instead of ethanol.

EXAMPLE 3

1-phenyl-5-methyl-3-pyrazolidone

Sodium (3.0 g.) was dissolved in absolute ethanol (100 cc.) and phenyl hydrazine (10.0 cc.) added, followed by ethyl crotonate (11.4 g.). The resulting solution was boiled under reflux for two hours and all the volatile material then removed under reduced pressure at 100°. The solid residue was dissolved in water (50 cc.) and the solution saturated with carbon dioxide at 0°. The resulting crystalline precipitate was filtered off, dried in vacuo and recrystallised from benzene to give small colourless needles of 1-phenyl-5-methyl-3-pyrazolidone, M. Pt. 127°.

EXAMPLE 4

1-phenyl-5:5-dimethyl-3-pyrazolidone

Sodium (3.0 g.) was dissolved in absolute ethanol (100 cc.) and phenyl hydrazine (10.0 cc.) added, followed by ethyl-β.β-dimethyl acrylate (12.6 g.). The resulting solution was boiled under reflux for sixteen hours and the volatile material then removed under reduced pressure at 100°. The solid residue was dissolved in water (50 cc.) and the solution saturated with carbon dioxide at 0°. The precipitated crystalline mass was filtered off and recrystallised from water to give 1-phenyl-5:5-dimethyl-3-pyrazolidone as colourless plates, M. Pt. 160°.

EXAMPLE 5

1:5-diphenyl-3-pyrazolidone

Sodium (3.0 g.) was dissolved in absolute ethanol (100 cc.) and phenyl hydrazine (10.0 cc.) added, followed by ethyl cinnamate (16.6 cc.). The resulting solution was boiled for sixteen hours and then all volatile material removed under reduced pressure at 100°. The residue was dissolved in water and the filtered solution saturated with carbon dioxide at 0°. The resulting bulky precipitate was filtered off, dried in vacuo and recrystallised from benzene to give colourless microcrystals of 1:5-diphenyl-3-pyrazolidone, M. Pt. 157–8°.

What we claim is:

1. A process for the production of 3-pyrazolidones which comprises heating, under anhydrous conditions and in the presence of a basic condensing agent, a hydrazine of the general formula $RNH.NH_2$ where R is selected from the class consisting of phenyl, alkylphenyl and halogenophenyl groups, with an ester of the general formula:

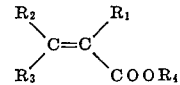

where $R_1$ is selected from the class consisting of the hydrogen atom and alkyl groups, $R_2$ is selected from the class consisting of the hydrogen atom, phenyl, alkylphenyl, halogenophenyl and alkyl groups, $R_3$ is selected from the class consisting of the hydrogen atom and alkyl groups, and $R_4$ is an alkyl group.

2. A process for the production of 3-pyrazolidones which comprises heating, under anhydrous conditions and in the presence of an alkali alkoxide, a hydrazine of the general formula $RNH.NH_2$ where R is selected from the class consisting of phenyl, alkylphenyl and halogenophenyl groups, with an ester of the general formula:

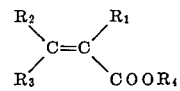

where $R_1$ is selected from the class consisting of the hydrogen atom and alkyl groups, $R_2$ is selected from the class consisting of the hydrogen atom, phenyl, alkylphenyl, halogenophenyl and alkyl groups, $R_3$ is selected from the class consisting of the hydrogen atom and alkyl groups, and $R_4$ is an alkyl group.

3. A process for the production of 3-pyrazolidones which comprises heating, under anhydrous conditions and in the presence of an alkali hydroxide, a hydrazine of the general formula $RNH.NH_2$ where R is selected from the class consisting of phenyl, alkylphenyl and halogenophenyl groups, with an ester of the general formula:

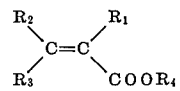

where $R_1$ is selected from the class consisting of the hydrogen atom and alkyl groups, $R_2$ is selected from the class consisting of the hydrogen atom, phenyl, alkylphenyl, halogenophenyl and alkyl groups, $R_3$ is selected from the class consisting of the hydrogen atom and alkyl groups, and $R_4$ is an alkyl group.

4. A process for the production of 3-pyrazolidones which comprises heating, under anhydrous conditions and in the presence of a substantially equimolecular proportion of an alkali alkoxide, a hydrazine of the general formula $RNH.NH_2$ where R is selected from the class consisting of phenyl, alkylphenyl and halogenophenyl groups, with an ester of the general formula

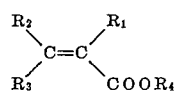

where $R_1$ is selected from the class consisting of the hydrogen atom and alkyl groups, R₂ is selected from the class consisting of the hydrogen atom, phenyl, alkylphenyl, halogenophenyl and alkyl groups, R₃ is selected from the class consisting of the hydrogen atom and alkyl groups, and R₄ is an alkyl group.

5. A process for the production of 3-pyrazolidones which comprises heating, under anhydrous conditions and in the presence of a substantially equimolecular proportion of an alkali hydroxide, a hydrazine of the general formula RNH.NH₂ where R is selected from the class consisting of phenyl, alkylphenyl and halogenophenyl groups, with an ester of the general formula:

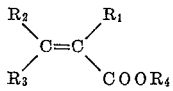

where R₁ is selected from the class consisting of the hydrogen atom and alkyl groups, R₂ is selected from the class consisting of the hydrogen atom, phenyl, alkylphenyl, halogenophenyl and alkyl groups, R₃ is selected from the class consisting of the hydrogen atom and alkyl groups, and R₄ is an alkyl group.

6. A process for the production of 3-pyrazolidones which comprises heating, under anhydrous conditions and in the presence of a basic condensing agent, a hydrazine of the general formula RNH.NH₂ where R is selected from the class consisting of phenyl, alkylphenyl and halogenophenyl groups, with an ester of the general formula:

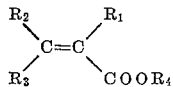

where R₁ is selected from the class consisting of the hydrogen atom and alkyl groups, R₂ is selected from the class consisting of the hydrogen atom, phenyl, alkylphenyl, halogenophenyl and alkyl groups, R₃ is selected from the class consisting of the hydrogen atom and alkyl groups, and R₄ is an alkyl group, passing carbon dioxide into the reaction mixture and separting the precipitate formed.

7. A process for the production of 3-pyrazolidones which comprises heating, under anhydrous conditions and in the presence of a substantially equimolecular proportion of an alkali alkoxide, a hydrazine of the general formula RNH.NH₂ where R is selected from the class consisting of phenyl, alkylphenyl and halogenophenyl groups, with an ester of the general formula:

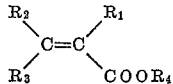

where R₁ is selected from the class consisting of the hydrogen atom and alkyl groups, R₂ is selected from the class consisting of the hydrogen atom, phenyl, alkylphenyl, halogenophenyl and alkyl groups, R₃ is selected from the class consisting of the hydrogen atom and alkyl groups, and R₄ is an alkyl group.

8. A process for the production of 3-pyrazolidones which comprises heating, under anhydrous conditions and in the presence of a substantially equimolecular proportion of an alkali hydroxide, a hydrazine of the general formula RNH.NH₂ where R is selected from the class consisting of phenyl, alkylphenyl and halogenophenyl groups, with an ester of the general formula:

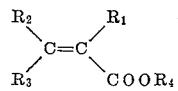

where R₁ is selected from the class consisting of the hydrogen atom and alkyl groups, R₂ is selected from the class consisting of the hydrogen atom, phenyl, alkylphenyl, halogenophenyl and alkyl groups, R₃ is selected from the class consisting of the hydrogen atom and alkyl groups, and R₄ is an alkyl group, passing carbon dioxide into the reaction mixture and separting the precipitate formed.

9. Process for the production of 1-phenyl-3-pyrazolidone which comprises heating phenyl hydrazine with an alkyl acrylate under substantially anhydrous conditions and in the presence of a strong basic condensing agent.

10. Process for the production of 1-phenyl-3-pyrazolidone which comprises heating phenyl hydrazine with an ethyl acrylate under substantially anhydrous conditions and in the presence of a strong basic condensing agent.

References Cited in the file of this patent

UNITED STATES PATENTS

| Number | Name | Date |
|---|---|---|
| 2,289,367 | Kendall | July 14, 1942 |

FOREIGN PATENTS

| Number | Country | Date |
|---|---|---|
| 5,745 | Great Britain | 1892 |

OTHER REFERENCES

Berichte, vol. 28, pp. 626, 630.